Jan. 14, 1930.  J. C. WELLS  1,743,742
OPHTHALMIC MOUNTING
Filed Jan. 16, 1928

Inventor
Joel C. Wells.
By Harry H. Styll
Attorney

Patented Jan. 14, 1930

1,743,742

UNITED STATES PATENT OFFICE

JOEL C. WELLS, OF SOUTHBRIDGE, MASSACHUSETTS

OPHTHALMIC MOUNTING

Application filed January 16, 1928. Serial No. 247,041.

This invention relates to ophthalmic mountings and has particular reference to a split rim having an improved endpiece construction for supporting a temple and an improved process for making the same.

The principal object of the invention is to provide an endpiece having improved means for supporting a temple to prevent its becoming loose and to secure the endpiece members together without loose play.

Another object of the invention is to provide a longer thread bearing for the temple and endpiece securing means.

Another object is to provide means whereby the endpiece members may be easily and quickly aligned for securing them together.

Another object of the invention is to provide rigid bearing means for pivotally supporting the temples and to provide increased thread bearing for the temple and endpiece securing screws so that the screws will not back out and become loose.

Another object of the invention is to provide improved means for securing the tubular temple bearing and aligning means in one of the endpiece members.

Other objects and advantages of the invention will become apparent from the following specification taken in connection with the accompanying drawings and it will be understood that many changes may be made in the details of construction and arrangements shown and described without departing from the spirit of the invention as expressed in the appended claims, the preferred forms only having been shown and described by way of illustration.

Referring to the drawing.

Figure 1:
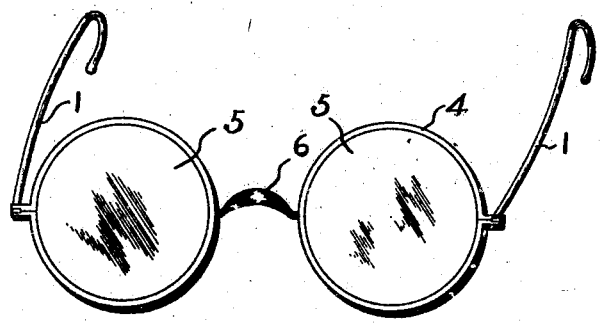
Fig. 1 is a front view of an ophthalmic mounting embodying the invention.
Figure 2:
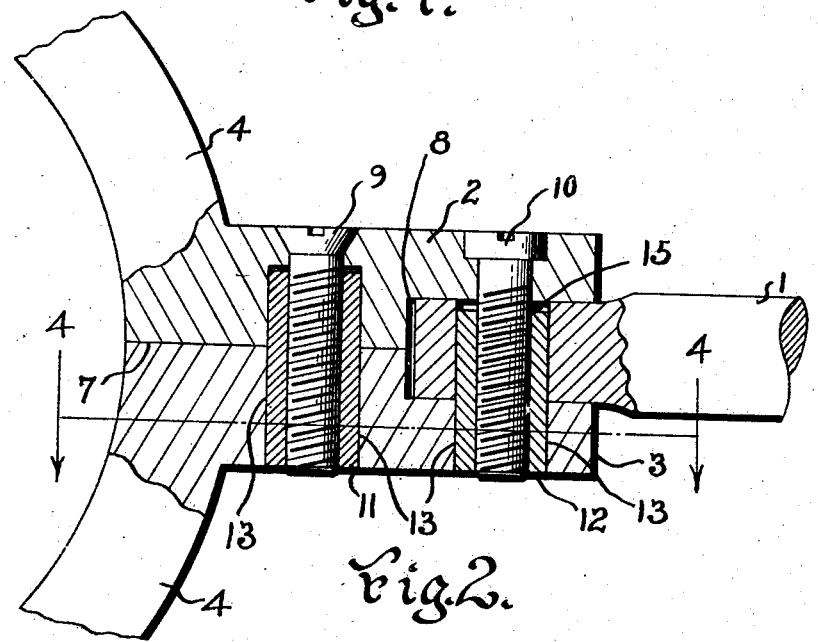
Fig. 2 is an enlarged sectional view of the endpiece.
Figure 3:
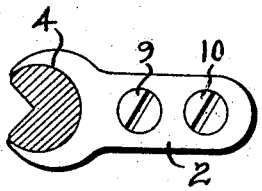
Fig. 3 is a plan view of Fig. 2.
Figure 4:
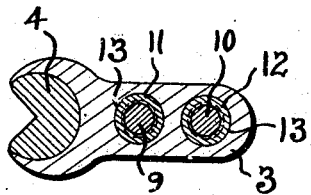
Fig. 4 is a sectional view on line 4—4 of Fig. 2.

Prior to the present invention ophthalmic mountings having split rims provided with slotted or recessed endpiece members secured together by screws, one of which was adapted to draw the endpieces together to secure the lens in the rim and the other to pivotally support the temple were in use, but this construction was faulty due to the twisting action of the rim members and ratchet action of the temple when moved on the screw as a pivot. Both the twisting action of the frame and ratchet action of the temple caused the screw members to back out and loosen so that the lenses and temples would become loose and render the mounting unusable. Another difficulty encountered was that it was impracticable to provide sufficient thread bearing in one of the endpiece members to prevent the threads from becoming stripped or broken under the strain of the screws when tightened sufficiently to hold the lenses against rotation within the rims and to hold the temples in operative position.

The present invention obviates these difficulties by providing means for increasing the thread bearing of the endpiece and the temple securing screws. The means used for increasing the thread bearing of the endpiece screw also serves as means for automatically aligning the endpiece members and aids in preventing them from twisting. The increased thread bearing means for the temple connection also serves as a pivot for the temple and obviates the ratchet action of the temple upon the screw as in the prior art construction and thereby prevents the screw from backing out and becoming loose. Both thread bearing members are rigidly secured in one of the endpiece members and thus provide an endpiece construction which is durable and which will not allow the lenses or temples to become loose.

Referring more particularly to the drawing, the temples 1 are positioned in the endpiece members 2 and 3 which are mounted on the ends of the split lens rims 4. The rims 4 have the lenses 5 positioned therein and are connected centrally by the bridge member 6. The endpiece members 2 and 3 are formed with the abutting faces 7 which terminate with the slotted or recessed portion 8 adapted to receive the recessed end of the temple 1. The endpiece members 2 and 3 are formed with aligned openings in which the screws 9 and 10 and tubular members 11 and 12 are positioned. The tubular members 11 and 12 are secured in the openings in the endpiece member 3 by pressing the tubular members therein, and are rigidly secured in the openings by hard solder or the like along the abutting faces 13. The soldering is accomplished by first forming a close connection between the tubular members 11 and 12 and the endpiece member 3. This joint is then heated with a piece of solder at the joint, the surface tension between the parts and the solder causing the melted solder to be drawn into the joint between the parts so that the abutting surfaces 13 will be thoroughly united when cool.

The tubular members 11 and 12 extend beyond the abutting face 7 and are provided centrally with the threaded bores adapted to receive the threaded portion of the screws 9 and 10 and thereby provide an increased thread bearing for the screw members. The tubular member 11 extends within the endpiece member 2 and provides means for automatically aligning the endpiece members and holds them in aligned position so that the screw may be easily inserted. The tubular member 12 projects into the recess 15 and provides a bearing support for the temple 1 and it also is provided with a threaded bore adapted to receive the threaded portion of the screw 10. The tubular member 12 serves as means for holding the temple 1 in assembled position during the removal or replacement of a lens in the lens rim and also prevents backing out and loosening of the screw 10 as in the prior art constructions.

The operation of the device is as follows: The recessed end of the temple 1 is positioned in the recess in the end of the endpiece member 3 and on the projecting portion of the tubular member 12, and the endpiece member 2 is then positioned over the projecting portion of the tubular member 11 and is held in position by the operator during the positioning of the screw 9 therein. The screw 9 is then tightened to draw the endpiece members together to rigidly secure the lens 5 within the rim 4.

It will be noted that when the endpiece member 2 is positioned over the projecting portion of the tubular member 11 the endpiece members will be automatically aligned and accurately positioned relative to each other and that the tubular member 11 also provides increased thread bearing for the screw member 9 so that the threads will not strip during the tightening of the screws. The screw member 10 may then be positioned in the tubular member 12 to secure the temple in operative position, and also provides a longer thread bearing for the screw 10 and serves as a pivot for the temple 1. It will be noted that the tubular member 12 is rigidly secured to the endpiece member 3 and thereby allows the temple 1 to be pivoted about the tube without causing the screw member 10 to back out or loosen as previously stated.

From the foregoing description it will be seen that I have provided simple, economical and efficacious means for securing lenses within the lens rims and preventing temples and endpieces from becoming loose during their continued use.

Having described my invention, I claim:

1. An endpiece for an ophthalmic mounting comprising two abutting endpiece members having a recess therein adapted to receive the hinge end of a temple and having aligned openings for the means for holding the abutting members together and aligned openings for the means for holding the temple in place in the temple recess, a tubular member in the opening for the means for holding the abutting members together extending through one abutting member and into and partially through the other abutting member, screw means extending through the tube and the partially bored abutting member, a tubular member in the opening for the means for securing the temple extending from the same surface of the same abutting member as the first tubular member extends from through one abutting member into but not entirely through the temple recess, screw means through the other abutting member and through the tube, and a temple part in the temple recess and having an opening through which the tubular member in the opening for the temple securing means projects to form a bearing for the temple.

2. An endpiece for an ophthalmic mounting comprising two abutting endpiece members having a recess therein adapted to receive the hinge end of a temple and having aligned openings for the means for holding the abutting members together and aligned openings for the means for holding the temple in place in the temple recess, a tubular member rigidly secured in the opening for the means for holding the abutting members together extending through one abutting member and into and partially through the other abutting member, screw means extending through the tube and the partially bored abutting member, a tubular member rigidly secured in the opening for the means for securing the temple extending from the same surface of the same abutting member as the first tubular member extends from through one abutting member into but not entirely through the temple recess, screw means through the other abutting member and through the tube, and a temple part in the temple recess and having an opening through which the tubular member in the opening for the temple securing means projects to form a bearing for the temple.

3. An endpiece for an ophthalmic mounting comprising two abutting endpiece members having a recess therein adapted to receive the hinge end of a temple and having aligned openings for the means for holding the abutting members together and aligned openings for the means for holding the temple in place in the temple recess, a tubular member soldered in the opening for the means for holding the abutting members together extending through one abutting member and into and partially through the other abutting member, screw means extending through the tube and the partially bored abutting member, a tubular member soldered in the opening for the means for securing the temple extending from the same surface of the same abutting member as the first tubular member extends from through one abutting member into but not entirely through the temple recess, screw means through the other abutting member and through the tube, and a temple part in the temple recess and having an opening through which the tubular membe in the opening for the temple securing means projects to form a bearing for the temple.

JOEL C. WELLS.